Figure 1:
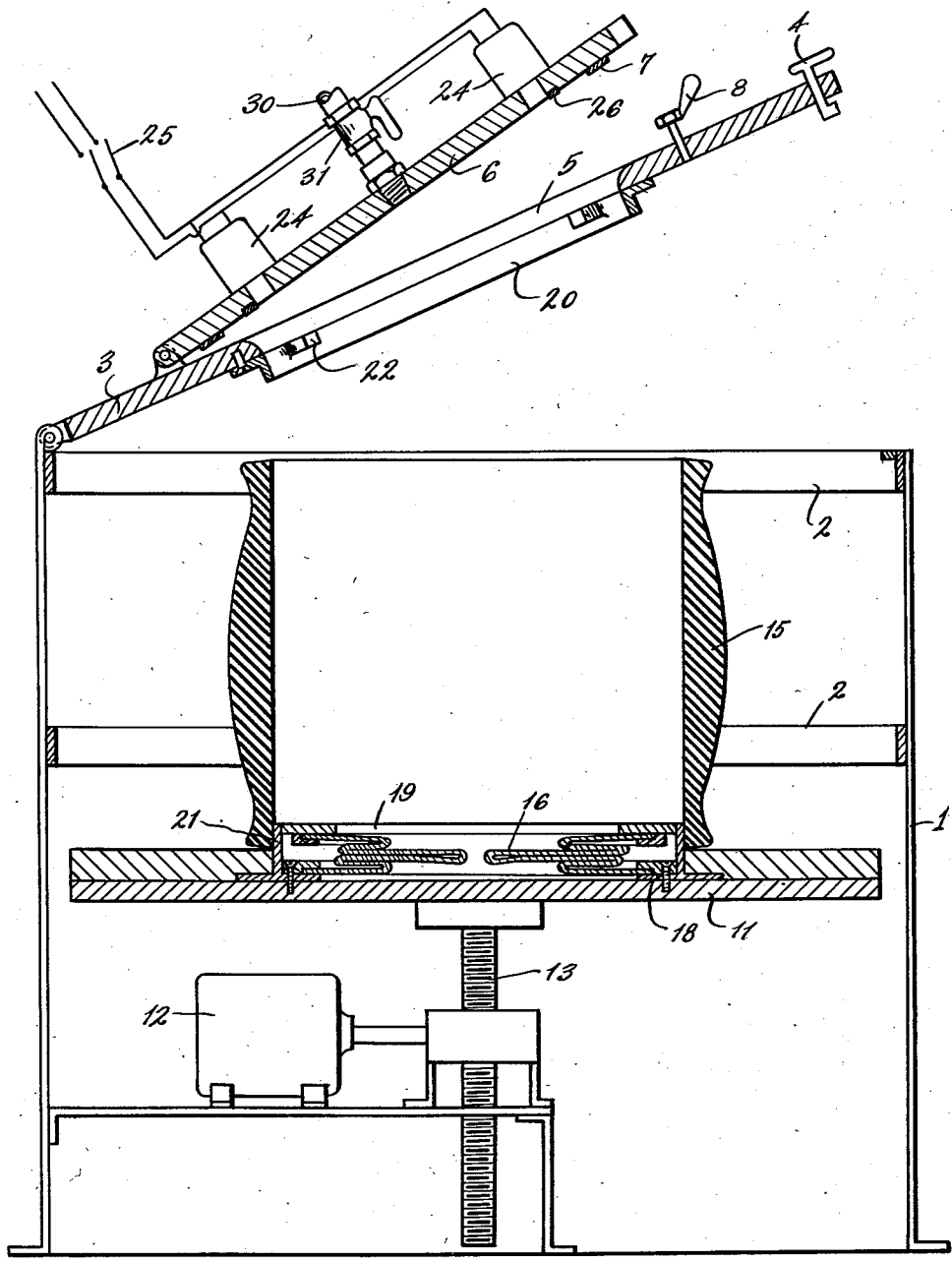

Dec. 29, 1936.　　W. G. LERCH ET AL　　2,065,943

TIRE EXPANDER

Filed Feb. 1, 1934　　2 Sheets-Sheet 1

INVENTOR.
William G. Lerch
BY Murden T. Bryant

Bay, Oberlin & Bay
ATTORNEYS

Dec. 29, 1936.  W. G. LERCH ET AL  2,065,943
TIRE EXPANDER
Filed Feb. 1, 1934　　2 Sheets-Sheet 2
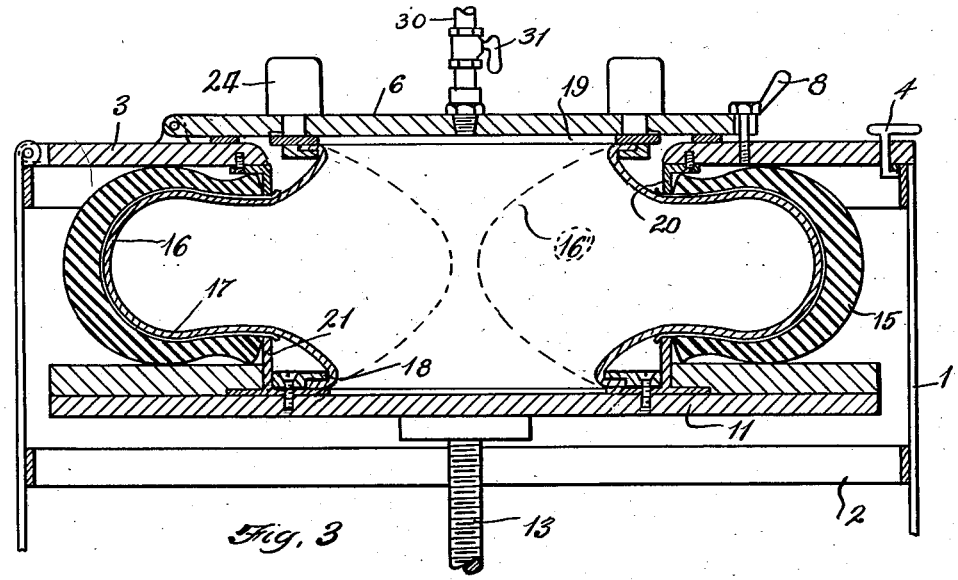
Fig. 3
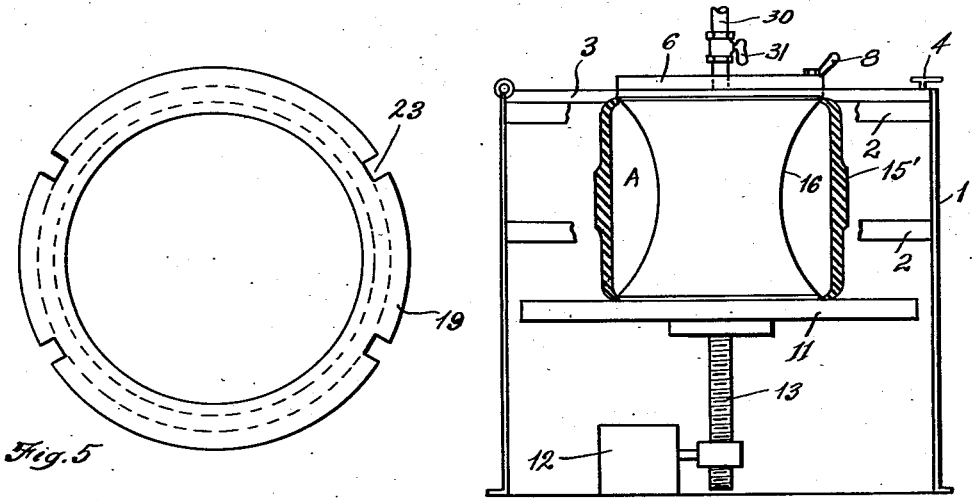
Fig. 5
Fig. 2
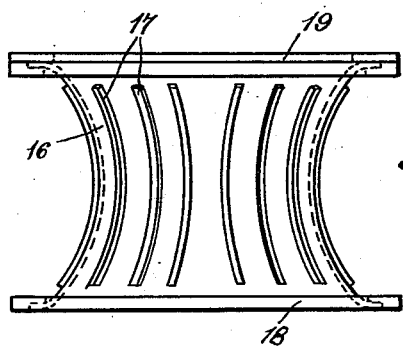
Fig. 4
INVENTOR.
William G. Lerch
BY Murden T. Bryant
Ray, Oberlin & Ray
ATTORNEYS.

Patented Dec. 29, 1936

2,065,943

UNITED STATES PATENT OFFICE 2,065,943

TIRE EXPANDER

William G. Lerch, Akron, and Murden T. Bryant, Findlay, Ohio, assignors to Master Tire and Rubber Corporation, Akron, Ohio, a corporation of Delaware Application February 1, 1934, Serial No. 709,315

11 Claims. (Cl. 154—10)

This invention relates to a mechanism for expanding tires which have been built on the flat band process. As is well known, tires which have been built on a drum, by the so-called "pulley-band" method have to be changed to the conventional horseshoe-shaped cross section.

In particular the purpose of our invention is to perform this expansion by a relatively simple machine and in a manner which will not disrupt the tire structure. It is known, for example, to expand tire casings by vacuum, but this has an injurious effect in sometimes pulling the treads and side wall portions of the tire loose from the carcass. This can be avoided by applying expansion pressure from inside, but a difficulty is here encountered in retaining the air pressure inside the tire during the expansion and applying expanding pressure uniformly.

The invention is particularly directed to means for retaining and applying the air pressure inside the tire and for permitting ready withdrawal of the tire from such expanding means.

As the tire expands, the beads approach one another, and it is one of the aims of the invention to apply expanding pressure while the beads are approaching. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In the accompanying drawings Fig. 1 is a view partly in section and partly in perspective showing our improved machine at the beginning of its operation, the section taken being central and vertical; Fig. 2 is a diagrammatic central vertical sectional view showing the parts in position before the expansion begins, but with a different type of tire; Fig. 3 is a central vertical section showing the tire completely expanded; Fig. 4 is a side elevation of an apron used in the apparatus; and Fig. 5 is a top view of Fig. 4.

The tire expander in the preferred form here shown comprises a supporting framework 1 which may be of open construction such as a plurality of vertical legs connected by horizontal rings 2. An upper disk or top plate 3 is hinged to this framework as shown and may be either lifted up to open the top of the frame or set down as in Figs. 2 and 3 and locked in position by any suitable device such as the latch 4 shown in some-what diagrammatic style. This upper disk 3 has a central opening 5 closable by a smaller lid 6 having suitable gaskets 7 and locking arrangements 8.

The machine also includes a lower disk or platform 11 which may be raised by appropriate mechanism to any desired position. A motor 12 driving a threaded vertical shaft 13 is here indicated for that purpose.

As already stated, the action of the mechanism is in general that a tire 15 in the flat band condition is placed on the lower disk 11 as shown in Fig. 1, the lid 3 is closed and the lower disk raised. This raising, together with the internal application of compressed air shapes the tire as shown in Fig. 3. In Fig. 2 a drop-bead tire 15', such as made on a drop-shoulder drum, is shown in the expander.

The compressed air is not applied directly to the tire casing, but is applied within a sleeve, or apron, as it is more generally known, 16. This apron is a hollow collapsible element which is preferably made of rubber of about the same thickness and resiliency as is used for inner tubes. In the preferred form here shown the exterior surface carries a number of ribs or strips 17 which may conveniently be strips of the same material cemented on. The apron 16 is fastened at the bottom to the lower plate 11 by any suitable means such as a clamping ring 18, and at the top is fastened to a ring 19, known as the sealing ring.

The apron 16 may assume any one of a variety of forms as variously shown in Figs. 1, 2, 3 and 4. This feature will become clear as the operation of the apparatus is described below. The top plate 3 is equipped with a tire positioning ring or lip 20 surrounding the aperture 5 on the lower side and the bottom plate 11 is equipped with a ring 21 of the same diameter vertically therebelow on the bottom plate 11. As a matter of convenience the bottom plate 11 is here shown as built up higher outside of the ring 21 than inside of it. The ring 20 has a plurality of lugs 22 adapted to be passed by apertures 23 in the ring 19 and to support the ring 19 when the latter is slightly turned, thus positioning the apron 16 in the shape shown in Figs. 2 and 4 at certain stages of the operation. Electromagnets 24 controlled by a switch 25 serve to lift the ring 19 off the lugs 22 into air-tight contact with a gasket 26 on the under side of the lid 6 before and during the application of air pressure inside the apron 16. Air is applied to the apron 16 through pipe 30 having a suitable inlet and exhaust valve 31.

The rings 20 and 21 may be substituted in various sizes according to the diameter of tires to be worked on, thus varying the capacity of the machine within reasonable limits. Ordinarily the resiliency of the apron is sufficient for all sizes of tires which are within the capacity of any machine so that it is not usually necessary to change the apron and its rings 18 and 19 for different sizes, although this can be done if occasion arises. In running any particular size of tires the bottom plate 11 is lowered away only to the height of the tire. Suitable automatic stops, not shown, can be provided so that in lowering the plate 11 it will not go below the level necessary for the job in hand.

The cycle of operations is as follows. The lid 3 being raised sufficiently for the purpose and the lower plate 11 being at the proper height, the tire 15, in flat band shape is placed in the machine with its lower bead outside the ring 21, as shown in Fig. 1. The lid 3 is then lowered and clamped down while the lid 6 is left open. The operator reaches in and takes the sealing ring 19 by hand, lifts it from the position of Fig. 1 to that of Fig. 2 passing the openings 23 over the lugs 22 and giving the ring 19 a slight twist so that it is held up by the lugs. He then closes and clamps the lid 6, and closes the switch 25 so that the electromagnets 24 are energized and bring the sealing ring 19 to air-tight engagement with the gasket 26. At the same time the motor 12 is started and the air is admitted, somewhat gradually, through the valve 31. Thus as the lower plate 11 rises, the apron 16 is expanded and the operation ends with the parts in the positions shown in solid lines in Fig. 3. This position is held for a full minute or longer, thus allowing the elements of the tire 15 to adjust themselves to the expanded position. Next the air is exhausted through the valve 31. Due to an effect which will be described below, thereupon the apron 16 assumes approximately the position 16'. The lid 6 is then opened and the operator turns the sealing ring 19 to allow it to drop past the lugs 22 into the position of Fig. 1. Due to the reduced middle diameter of the apron it folds itself entirely inside the diameter of the rings 18 and 19 as shown in Fig. 1 and is out of the way.

The subsequent steps are those common to any sort of tire expander and comprise the introduction of a curing bag, the opening of the large lid 3 and the removal of the tire, with the bag therein, for curing. The bottom plate 11 is then lowered for the next cycle of operations.

The action of the machine as a whole having been described, some further explanation of the action of the apron and of the function of the strips 17 is necessary.

It has been found that the apron 16, if entirely smooth, has an objectionable tendency to stick to the inside of the tire 15. This can best be avoided by retaining a layer of air between the tire and the apron. The preferred arrangement for doing so comprises the use of the strips 17 already described, which form air pockets and reduce the area of rubber-to-rubber contact between the apron and the tire. By reference to Fig. 2 it will be observed that there is a space, a cross section of which is designated by the reference character A, between the apron and the tire before air pressure is applied. The air within this area is entrapped as the apron begins to expand and thus a layer of air, under some pressure, is maintained as the tire collapses to the position of Fig. 3. When the air within the apron is released by the valve 31, as already mentioned, this entrapped air serves to force the apron to a position approximately represented by the dotted lines 16', Fig. 3, and escapes when the lid 6 is opened.

It will be understood that although strips 17 are shown as the preferred form for accomplishing this result that it might be attained in any one of a variety of suitable ways.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A tire expanding mechanism comprising upper and lower members movable towards one another, means on said members to guide the beads of an edgewise-disposed flat band tire standing on the lower member without confining such beads, an apron carried by said members adapted to engage the inner surface of said tire, means for applying air pressure within said apron, and means for causing said members to approach one another during such application of pressure.

2. A tire expander comprising a lower plate, an upper plate, a hollow flexible element secured to said lower plate, means for attaching said element to said upper plate, and additional means for bringing said element into air-tight contact with said upper plate.

3. In a tire expander having mutually approachable parallel upper and lower elements, a collapsible flexible apron attached at one end in air-tight engagement to the lower of said elements and means for successively securing the other end of said apron first in non-air-tight and next in air-tight engagement to the upper of said elements.

4. In a tire expander having mutually approachable parallel upper and lower elements, a collapsible flexible apron attached in air-tight engagement to the lower of said elements and attachable in air-tight engagement to the upper of said elements, said apron, when extended, being of generally cylindrical form with reduced midsection, and means on the surface of said apron adapted to form air spaces between said apron and a tire when said apron contacts a tire.

5. In a tire expander having mutually approachable parallel upper and lower elements, a collapsible flexible apron attached in air-tight engagement to the lower of said elements and attachable in air-tight engagement to the upper of said elements, said apron, when extended, being of generally cylindrical form with reduced midsection, and irregularities on the surface of said apron.

6. In a tire expander having mutually approachable parallel upper and lower elements, a collapsible flexible apron attached in air-tight engagement to the lower of said elements and attachable in air-tight engagement to the upper of said elements, said apron, when extended, being of generally cylindrical form with reduced mid section, said apron being smooth at upper and lower ends, and having a plurality of ribs on the portion between said ends.

7. A tire expander comprising a supporting frame, an upper plate movably attached thereto and movable into a horizontal position, a lower plate movable up and down in said frame, alignable positioning means on said upper and lower plates adapted to receive a flat band tire, an air-tight collapsible and expansible element juxtaposed within said positioning means on said bottom plate, a ring of magnetic material secured to the upper end of said collapsible element, a wall defining an opening through said top plate within said positioning means, elements, on said wall adapted to hold said ring, a door adapted to close said opening, electro-magnets on said door adapted to move said ring into close engagement with said door, and means for moving said lower plate upward and for expanding said collapsible element.

8. In a tire expander having mutually approachable parallel upper and lower elements, a collapsible flexible apron attached in air-tight engagement to the lower of said elements and attachable in air-tight engagement to the upper of said elements, said apron, when extended, being of generally cylindrical form with reduced mid section.

9. In a tire expander having mutually approachable parallel elements, a collapsible flexible apron attached in air-tight engagement to one of said elements and attachable in air-tight engagement to the other of said elements, said apron, when extended, being of generally cylindrical form with reduced mid section.

10. In a tire expander having mutually approachable upper and lower elements, a collapsible flexible apron attachable in air-tight engagement between said elements, and irregularities on the outer surface of said apron.

11. In a tire expander having mutually approachable upper and lower elements, a collapsible flexible apron adapted to extend between said elements and to be air-tight, and a plurality of raised members on the outer surface of said apron.

WILLIAM G. LERCH.
MURDEN T. BRYANT.